United States Patent
Yang (10) Patent No.: US 8,117,136 B2
(45) Date of Patent: Feb. 14, 2012

(54) RELATIONSHIP MANAGEMENT ON A MOBILE COMPUTING DEVICE

(75) Inventor: Yiching Yang, San Ramon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 838 days.

(21) Appl. No.: 12/201,063

(22) Filed: Aug. 29, 2008

(65) Prior Publication Data

US 2010/0057643 A1    Mar. 4, 2010

(51) Int. Cl.
G06E 1/00     (2006.01)
G06E 3/00     (2006.01)

(52) U.S. Cl. .............................. 706/11; 706/10; 706/45

(58) Field of Classification Search .................. None
See application file for complete search history.

(56) References Cited

U.S. PATENT DOCUMENTS

| | | | |
|---|---|---|---|
| 2005/0091272 A1* | 4/2005 | Smith et al. | 707/104.1 |
| 2006/0015638 A1* | 1/2006 | Holzhauser et al. | 709/232 |
| 2007/0033210 A1* | 2/2007 | Baudino et al. | 707/102 |
| 2007/0255785 A1* | 11/2007 | Hayashi et al. | 709/204 |

OTHER PUBLICATIONS

PCT International Search Report and Written Opinion, PCT Application No. PCT/US2009/053312, Feb. 2, 2010, 8 pages.

\* cited by examiner

*Primary Examiner* — Jeffrey A Gaffin
*Assistant Examiner* — Adrian Kennedy (57) ABSTRACT

A system and a method are disclosed for implementing managing relationships between data on a mobile computing based on user creation and definition of the relationships. A mobile computing device user generates asymmetric relationships between stored entities, events, tasks and communications. These asymmetric relationships are custom-generated by the user to reflect the user's classification and evaluation of the relationships. The user also assigns a score to each relationship and stored entity, event, task and communication to represent the user's classification of the relationship, entity, event, task or communication. Hence, the user assigns a value to the relationships between data as well as the stored data to indicate which relationship or stored data is most valuable to the user. The user-defined relationships between data can be automatically displayed when the mobile communication device is used to interact with a stored entity.

17 Claims, 8 Drawing Sheets

| IDENTIFIER 405 | ENTITY 410 | EVENTS 415 | TASKS 420 | RELATIONSHIPS 425 | COMMUNICATION 430 |
|---|---|---|---|---|---|
| 1 | FRANK J... | 8/20/2008 Tele... 9/12/2008 Meet... | Product Summary | Employed by ABC Boss of Sal F. Husband of Marie J | 7/31/2008 Telephone Call 7/20/2008 E-mail |
| 2 | Sal F... | 8/20/2008 Tele... 8/25/2008 Lunch 9/12/2008 Meet... | Plan Meeting | Employed by ABC Employee of Sal F. Brother of Chris N | 6/15/2008 Telephone Call 7/4/2008 SMS Message |
| | | | ... | | |

RELATIONSHIP MANAGEMENT ON A MOBILE COMPUTING DEVICE

BACKGROUND

1. Field of Art

The disclosure generally relates to the field of mobile computing, in particular to managing relationships between entities using a mobile computing device.

2. Description of the Related Art

Mobile computing devices are becoming increasingly more powerful and functional devices. Many mobile devices are multifunction devices with multiple device roles, such as personal digital assistant (PDA), smart phone, cellular phone, portable media player, voice recorder, video recorder, global positioning system (GPS), camera and electronic file storage. This increased functionality has resulted in mobile computing devices being used to manage appointments, tasks, contacts and other aspects of a user's life. Because of the portability of mobile computing devices, they allow users to rapidly modify and access information from various locations.

While conventional information management techniques on a mobile computing device allow users to maintain a contact database, a calendar, a task list and other types of personalized data, these conventional information management techniques often require use of disparate applications to maintain different types of data. This requires users to navigate between various applications to review contacts, determining outstanding tasks or receive notifications about pending appointments. Additionally, conventional information management techniques do not allow users to monitor and record relationships between various types of entities, such as individuals, businesses and events.

While personal information management software (PIM) allows users to maintain an address book, calendar and task list, PIM software requires users to manually record data in separate applications. For example, a calendar application is used to maintain a schedule while a separate address book is used to maintain contact information. This compartmentalized storage of data makes it difficult for users to generate and/or observe relationships between different types of entities. While enterprise customer relationship management software (CRM) provides users with limited features to maintain contacts and events, the CRM software merely allows users to monitor a limited set of relationships between entities within a business context, such as sales analysis, customer support or marketing.

Although users can access social networking websites from mobile communication devices and use the social networking websites to share information with other users and/or form communities with other users, social networking websites only permit certain types of relationships between entities. In particular, for a user to generate a relationship with another user via a social network, both users must agree to the generation of the relationship. For example, if a first user wants to establish a relationship with a second user, the second user must authorize or approve the relationship before it is generated. Hence, social networking websites only allow generation and maintenance of "symmetric relationships," where both entities involved expressly agree to the relationship. As relationships between entities are typically subjective and can be characterized differently by each entity in the relationship, social networking websites only allow users the ability to maintain certain types of relationships.

From the above, there is a lack of a system or method for managing user-defined relationships between disparate entities on a mobile computing device.

SUMMARY

Using various embodiments disclosed herein, a mobile computing device, for example a hand-held computing device, stores and updates data describing events, entities and tasks associated with a mobile computing device user. User-defined relationships between the stored events, entities and tasks are also stored to illustrate how the different data is interrelated. The user also assigns a numerical score to each relationship, entity, event and task so that a quantitative measure of how the user values each relationship, entity, event and task is also stored. Using these scores, the mobile computing device displays events, entities and tasks, as well as the relationship between each, to the user. This allows the user to monitor, maintain and update relationships with various types of data using the mobile computing device.

In one embodiment, the mobile computing device retrieves a stored record associated with a received data request. The stored record includes various fields describing an event, an entity, a task and can also include a field describing interactions with the entity. For example, the stored record having an entity field corresponding to an entity included in the data request is retrieved. A plurality of associations between the fields is then determined along with the associations describing relationships between the different fields. For example, the associations indicate that an entity is involved with an event, that an event is dependent on a task, an entity is working on a task, that an entity is related to another entity or other relationships describing how different fields affect one another. These relationships are defined by the user so that the relationships reflect the user's perception and classification of the relationship, allowing the relationships to accurately describe how the user perceives the relationship between events, entities and tasks. A score describing the user's valuation of the association and field is assigned to each of the associations and fields, allowing the user to specify which relationships and/or fields are more important to maintain or that have the most effect on the user. The score is used to determine a subset of the fields and associations that are presented to the user. This allows the mobile computing device to present the user with events, entities, tasks and relationships that may be most valued by the user, enabling the user to quickly access and view relationships valued by the user.

In one embodiment, data such as an event identifier and data describing an event, such as completion date, occurrence date or title is stored in an event capture module. Data describing one or more entities associated with the event is also stored in the event capture module to indicate persons or organizations affected by the event. The event capture module communicates with an entity store which includes data, such as name, contact information describing multiple entities, such as people, corporations, organizations or groups. The event capture module also includes data describing relationships between entities or between entities and events. The relationships are defined by a user and are based on the user's classification or perception of interaction between entities or an entity's involvement in an event. A task management module communicates with the entity store and event capture module and describes one or more actions to be completed by a user and relationships between the actions and one or more entities or events. An analysis module communicates with the event capture module, entity store and task management module and includes scores associated with the entities, events, actions and relationships between the entities, events and actions. The scores are assigned by the user and indicate the user's valuation of the stored data relative to other stored data. The analysis module evaluates theses scores to determine which events, entities, actions and relationships are displayed responsive to a user request for data. This allows the analysis module to present the user with the data that is most closely related to the data request and most valued by the user.

Defining relationships between various types of data, such as events, entities and tasks, allows rapid identification of how various data, such as events, entities and tasks interacts with or affect each other. Using asymmetric relationships to associate various types of data further allows a user to include descriptive information, such as a description of the user's subjective assessment of the relationship or specific details about characteristics of the relationships allows the defined relationship to provide additional information. The user also assigns a numerical score to each relationship, entity, event and task, providing a quantitative measure of how the user values each relationship, entity, event and task is also stored. Using these scores, a mobile computing device is able to display events, entities and tasks, as well as the relationship between each, to the user that are most relevant or most important to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings. The drawings include the following Figures:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
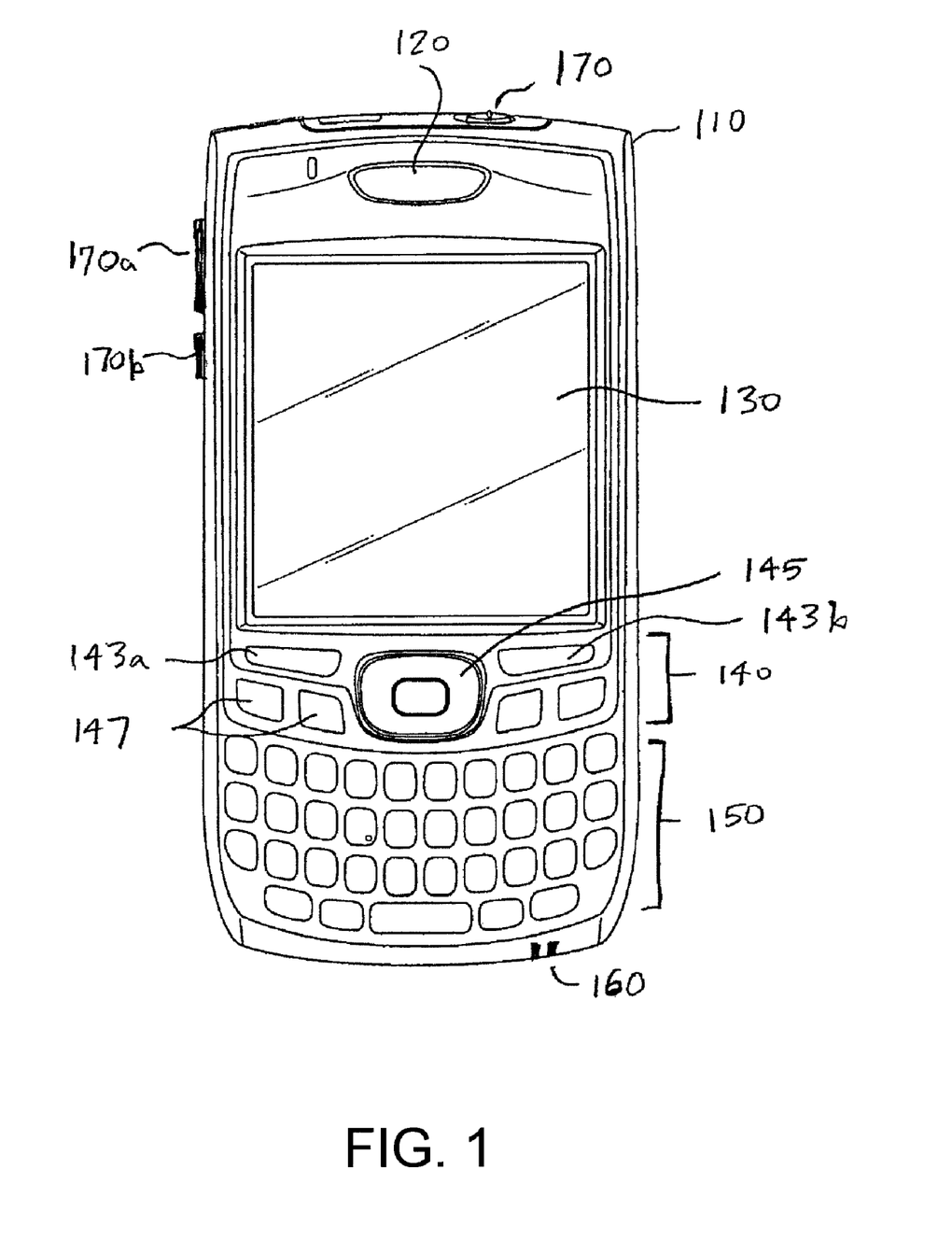
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 7 to 10 centimeters in length, 5 to 15 centimeters in width, 0.5 to 2.5 centimeters in height and weigh between 50 and 250 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is a numerical integer, e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
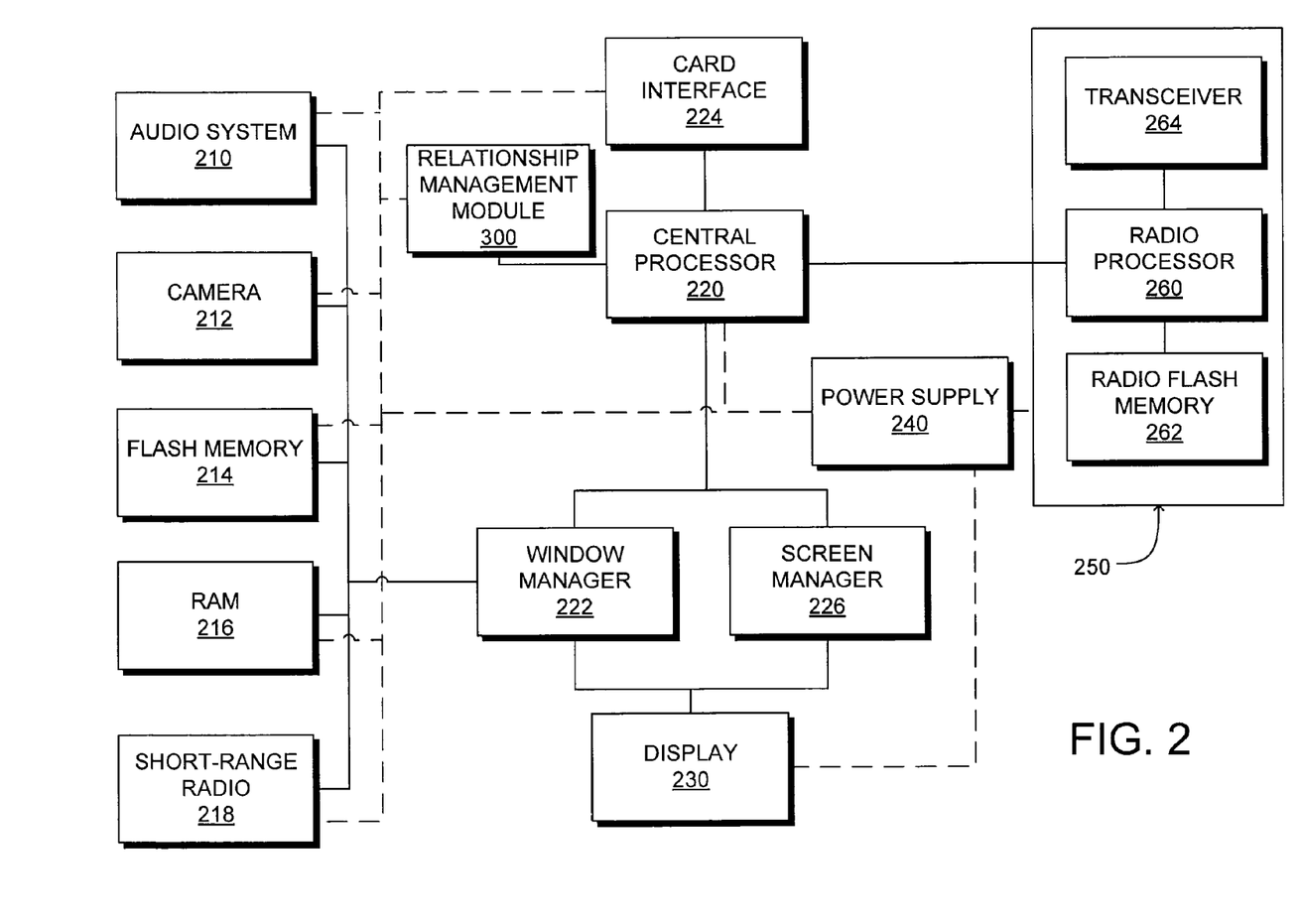
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), a window manager 222 and a screen manager 226. The power supply 240 powers the central processor 220, the radio subsystem 250 and a display driver 230 (which may be contact- or inductive-sensitive). The power supply 240 may correspond to a battery pack (e.g., rechargeable) or a power-line connection or component.

In one embodiment, the window manager 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly.

The screen manager 226 comprises a software or firmware process that manages content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The relationship management module 300 comprises a software or firmware process that identifies and manages relationships between types of data, or entities, stored by the flash memory 214 and communicates these relationships and additional data to the central processor 220 to modify the contents of the flash memory 214. In one embodiment, the relationship management module 300 identifies different types of stored data, the formats in which the types of data are stored and one or more relationships or interconnections between the types of data. The relationship management module alters or updates the stored data and/or relationships between stored data responsive to input from a user or from the central processor 220, to modify the content of the flash memory 214 to indicate changes to the stored data and corresponding changes to the relationships between stored data. In one embodiment, the screen manager 226 also specifies the format in which different types of data is stored in the flash memory 214. Although FIG. 2 shows the relationship management module 300 as a discrete module, in an embodiment, the relationship management module is stored within the flash memory 214. An embodiment of the relationship management module is further described below in conjunction with FIG. 3.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile, High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line.

The card interface 224 is adapted to communicate with the expansion slot. The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Figure 3:
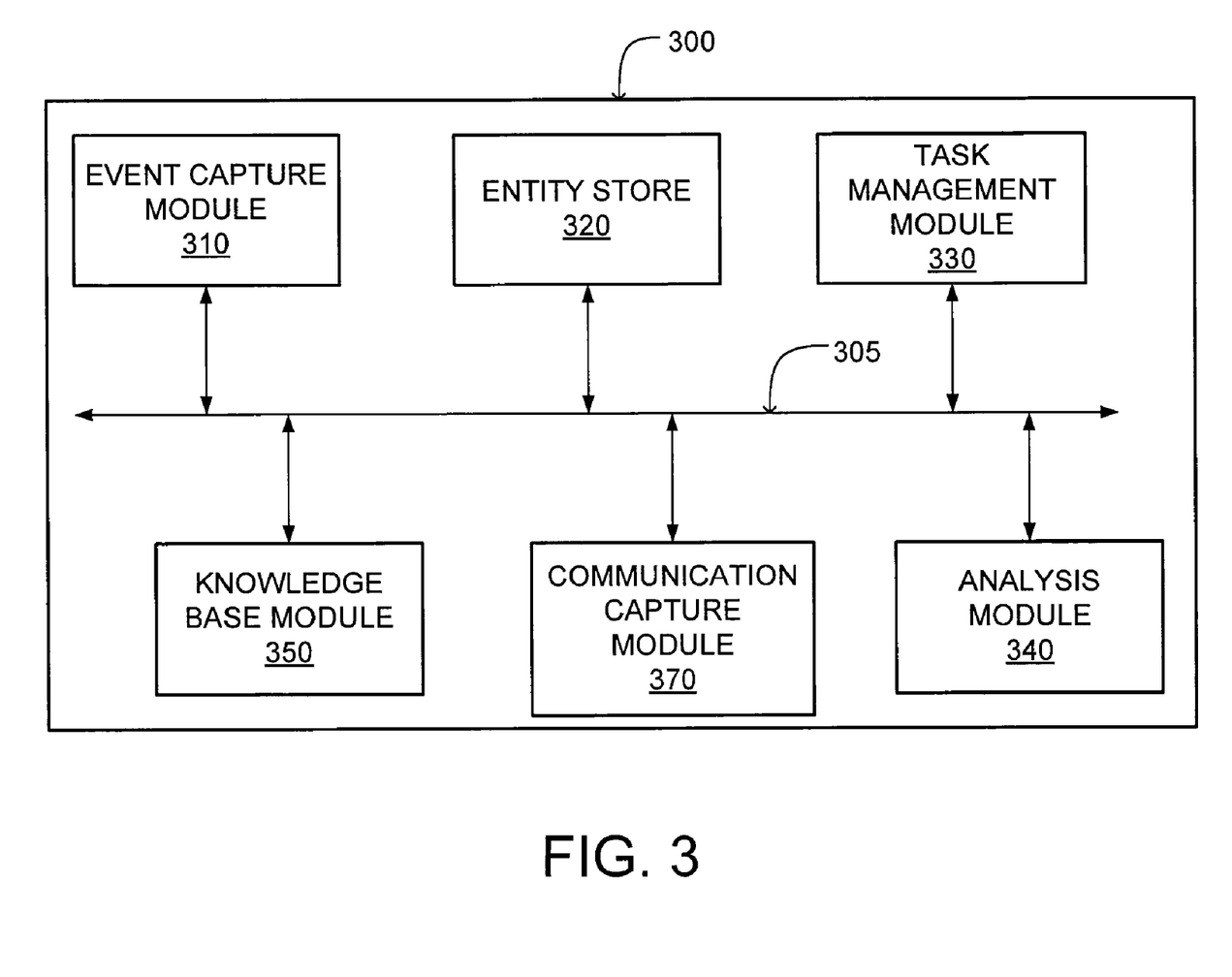
FIG. 3 illustrates one embodiment of a relationship management module for a mobile computing device.

FIG. 3 shows a block diagram of the relationship management module 300 according to one embodiment. The relationship management module 300 includes an event capture module 310, an entity store 320, a task management module 330, a knowledge base module 350 and an analysis module 340. In one embodiment, the event capture module 310, an entity store 320, a task management module 330, a knowledge base module 350 and an analysis module 340 communicate with each other using a bus 305.

The event capture module 310 stores data describing dates, times and locations associated with an event. Hence, the event capture module 310 stores data describing a date, a time and a location associated with an event involving the mobile computing device user. For example, the event capture module 310 includes data indicating that the mobile computing device user is to attend a meeting on Mar. 22, 2009 at 3:00 PM in a conference room. In an embodiment, the event capture module 310 also includes data describing the importance of an event and/or data which causes the mobile computing device 110 to remind a user of the mobile computing device 110 of a scheduled event prior to the time associated with the event. For example, data in the event capture module 310 is executed by the central processor 220 and causes the mobile computing device 110 to display a reminder message on the display 230 or play a reminder sound via audio system 210. Hence, the event capture module 310 allows a user to maintain a calendar using the mobile computing device.

The entity store 320 includes data describing one or more characteristics of user-specific entities, such as individual persons, corporations, organizations or other groups of persons. The entity store 320 includes an identifier, such as a first name and last name or organization or corporate name, associated with each entity and contact data associated with an entity. Examples of contact data include a telephone number, a fax number, an email address, a web page, a mailing address or any other data where the entity can receive data. In an embodiment, the entity store 320 categorizes the contact data into various types, allowing storage of multiple types of contact information with an entity, such as an email address and a telephone number. Additionally, the entity store 320 allows types of contact information to be further sub-classified into different categories. This allows the entity store 320 to include multiple telephone numbers or email addresses and separately classify the different telephone numbers or email addresses. For example, the entity store 320 includes multiple categories of telephone numbers, such as "business," "home" and "mobile."

Additionally, the entity store 320 includes data describing one or more relationships between stored entities and data included in the event capture module 310, the task management module 330 or other entities included in the entity store 320. The described relationships are user-defined to indicate relationships between different entities or entities and other data perceived by the user. For example, a user defines a relationship between various people and a corporation to indicate that the various people are employed by the corporation. As another example, the user defines a relationship between a first person and a second person describing a familial relationship (e.g., "brother," "sister," "father," "mother," etc.) indicating how the first person and second person are related. The people or entities included in the relationship are not notified of the relationship and are unable to modify or reject the relationship. This allows the user of the mobile computing device 110 to generate asymmetric relationships between entities that allow the user to specify a relationship between entities that allows the user to easily identify how different entities interact with each other.

While conventional methods for associating users require that the relationship fit within a limited set of categories, such as "friend of" or "married to," the relationships included in the entity store 320 are defined by the user, allowing the user to include as much detail in the relationship and allowing the relationship to account for subjective assessment of the relationship by the user. As relationships between entities are often subjective, meaning they are differently categorized by the entities involved, the entity store 320 enables the mobile device user to define a relationship between entities that accounts for the mobile device user's subjective classification and/or evaluation of the relationship. This allows the stored relationship data to better aid the user in preparing for subsequent interactions with different entities by providing a more detailed summary of how an entity affects other entities.

The task management module 330 includes data describing goals to be completed by the mobile computing device user. Hence, the task management module 330 describes the goal and a date by which the goal is to be completed. In an embodiment, the task management module 330 also includes data indicating how much of a task has been completed, such as data indicating a percentage of the goal already completed. The task management module 330 also includes data describing a relationship between a goal and one or more entities and/or one or more events. For example, the task management module 330 includes data describing the entity that is to receive the completed goal, the entity requesting completion of the goal, one or more people working on completing the same goal, an event by which the goal is to be completed or similar data. This allows the user of the mobile computing device 110 to rapidly identify entities or events associated with a goal to determine how to most efficiently complete the goal.

The analysis module 340 receives quantitative data from the event capture module 310, the entity store 320 and/or the task management module 330 describing an event, entity and/or goal. Hence, the analysis module 340 allows the mobile computing device user to describe or rank an event, entity and/or goal. For example, the analysis module 340 associates a numeric value with an event, entity, goal and/or relationship between event, entity and/or goal. In various configurations, this numeric value indicates how successful an event or goal was or how strong a relationship is with an entity. For example, the analysis module 340 allows a user to associate a numeric value with an entity describing the strength of the relationship between the user and the entity. As another example, the analysis module 340 allows a user to associate a numeric value with an event or a goal to indicate a level of success describing the event or goal. For example, a user can store a numerical value indicating how successful a presentation was, allowing the user to review and critique past events or goals.

The knowledge base module 350 includes information describing responses to scenarios or potential actions. For example, the knowledge base module 350 includes an indexed set of case studies describing multiple scenarios and one or more responses to each scenario. This allows the knowledge base module 350 to provide data or suggestions to the mobile computing device user describing possible responses to events, entities or goals, providing the mobile computing device user with suggested actions for responding to different situations. In an embodiment, the knowledge base module 350 includes a plurality of rules and case studies or business analysis logic describing situations and possible actions for responding to the described situations. The rules and case studies are indexed and able to be searched to expedite retrieval of data. In an embodiment, the knowledge base module 350 also includes a scoring or artificial intelligence system to identify possible actions most relevant to an event or entity.

The communication capture module 370 stores data describing communications to and from the mobile computing device 110. For example, the communication capture module 370 stores data describing telephone calls made from and received by the mobile computing device to generate a user call log or call history. The communication capture module 370 can also store text, Short Message Service (SMS), Multimedia Messaging Service (MMS) messages, email or chat messages received by or transmitted from the mobile computing device 110. The communication capture module 370 communicates with the event capture module 310, entity store 320 and/or task management module 330, allowing communications received by and transmitted from the mobile computing device 110 to be sorted or categorized by entities or persons involved in the communication or to be classified according to events or goals the user associates with the communications. This allows the mobile computing device user to efficiently access communications associated with an entity, event or task.

Figure 4:
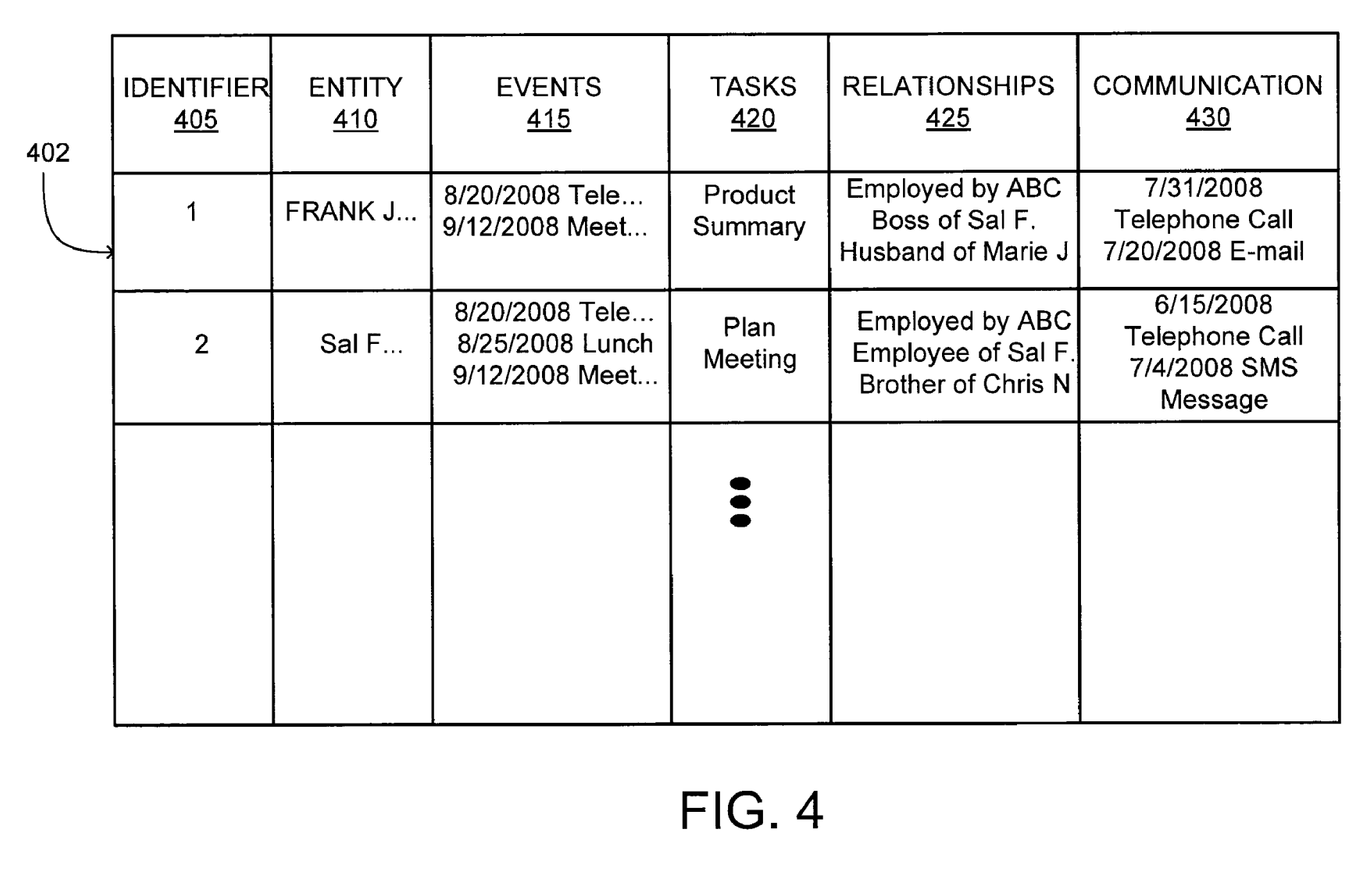
FIG. 4 illustrates one embodiment of data storage by a relationship management module.

FIG. 4 shows an example of data storage by the relationship management module 300. In the example shown in FIG. 4, the relationship management module 300 uses a database to identify related data. For example, the relationship management module 300 uses a database stored in the flash memory 214 to identify related data. As shown in FIG. 4, the example database used by the relationship management module 300 includes fields for an identifier 405, entity name 410, event descriptor 415, task descriptor 420, relationship descriptor 425 and communication record 430. The example database includes one or more records 402A-N, each record including a plurality of fields. However, in other embodiments, the relationship management module 300 includes different and/or additional fields or formats data in each field differently than shown in FIG. 4.

The identifier 405 uniquely identifies each record included in the database. In an embodiment the identifier 405 comprises an alphanumeric string identifying a record including a plurality of fields. Alternatively, the identifier 405 comprises a combination of data from one or more fields. The above descriptions are merely examples and the identifier 405 comprises any data that uniquely identifies each record in the database.

Each identifier 405 is associated with one or more fields including data stored by the relationship management module 300. The entity name 410 field includes data from the entity store 320 describing one or more entities. For example, the entity name 410 field includes data describing a first name and last name of a person or a corporate or organization name. Alternatively, the entity name 410 field includes an email address or phone number associated with an entity. The event descriptor 415 field includes data from the event capture module 310 describing an event, such as an event name, a date associated with the event name, a category associated with the event or other data associated with an event. The task descriptor 420 field includes data from the task management module 330 describing a goal, such as a goal name and a due date associated with the goal. The relationship descriptor 425 includes data from the entity store 320 and/or task management module 330 describing one or more relationships between the entity included in the entity name 410 field, one or more additional entities or one or more relationships between the entity included in the entity name 410 field and one or more tasks included in the task descriptor 420 and/or one or more relationships between the entity included in the entity name 410 field and one or more events included in the event descriptor 420. The communication record 430 includes data describing communications, such as telephone calls, emails, text messages or chat messages, received from the entity included in the entity name 410 field or communications sent to the entity included in the entity name 410 field.

System or Device Operation

Figure 5:
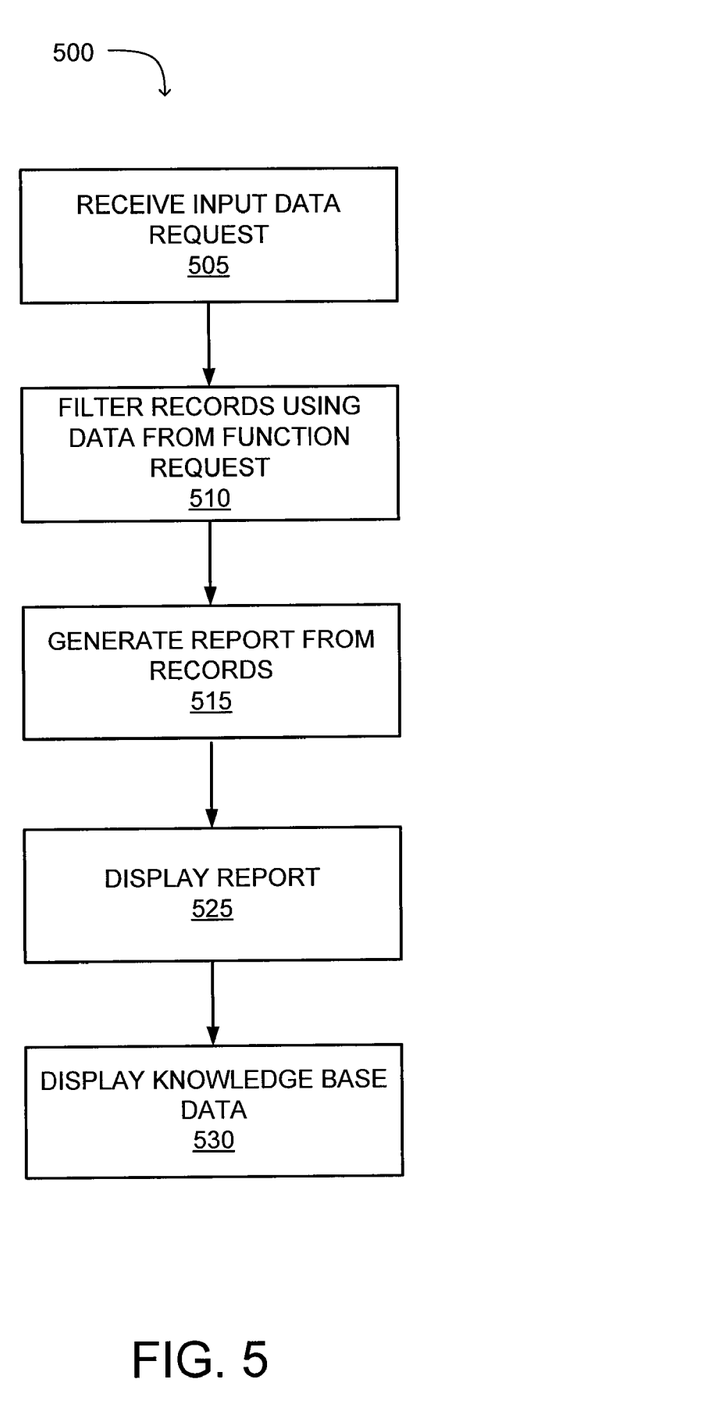
FIG. 5 illustrates a method for implementing a relationship management module in a mobile computing device.

FIG. 5 illustrates a flow chart of one embodiment of a method 500 for implementing a relationship management module 300. In an embodiment, the steps of the method 500 are implemented by the processor 220 executing instructions that cause the described actions. Those of skill in the art will recognize that one or more of the method steps may be implemented in embodiments of hardware and/or software or combinations thereof. For example, instructions for performing the described actions are embodied or stored within a computer readable medium, e.g., flash memory 214 or RAM 216, and are executable by a processor, such as central processor 220. Furthermore, those of skill in the art will recognize that other embodiments can perform the steps of FIG. 5 in different orders. Moreover, other embodiments can include different and/or additional steps than the ones described here.

Initially, a function request is received 505 by the relationship management module 300 requesting data. The input is received 505 from a user through the selection buttons 143, the keypad area 150, the screen 130, the microphone 160 or any other suitable component of the mobile computing device 110, or received 505 from a software or firmware process running on the processor 220. For example, the relationship management module 300 receives 505 a request from the processor 220 responsive to the mobile computing device receiving a telephone call, text message, email or other communication. This allows the mobile computing device to retrieve data from the relationship management module 300 that is associated with or related to the received communication. The received data request may request various types of data from the relationship management module 300. For example, a received input requests a person or entity from the entity store 320, a goal from the task management module 330 an event from the event capture module 310.

The data request is used to filter 510 data from the relationship management module 300 to identify data associated with the data request. By filtering 510, the relationship management module 300 identifies stored data most related to the data request. Hence, if the data request includes a telephone number, entity name or person's name, the relationship management module 300 is filtered 510 to retrieve stored data including the telephone number, entity name or person's name. For example, if the data request includes an entity name of "Bob Jones," data stored in the relationship management module 300 is filtered for data also having an entity name of "Bob Jones." If the relationship management module 300 stores data in a database similar to that shown in FIG. 4, the database records 402A-N are filtered to remove records that do not include "Bob Jones" in the entity name 410 field. This filtering 510 allows the relationship management module 300 to identify the stored data most relevant to the data request.

After filtering 510 the stored data, the relationship management module 300 generates 515 a report describing stored data related to the content of the data request and the relationships between the stored data and the content of the data request. For example, if the relationship management module 300 stores data in a database similar to that shown in FIG. 4, the report includes data from other fields included in the record 402 including data from the data request. Hence, if the data request identifies an entity name of "Bob Jones," the report includes data, such as event name, task name, relationship description, communication history from the database record 402 having "Bob Jones" stored in the entity name 410 field. As a record 402 includes data related to each other, data stored in the record 402 identified by filtering 510 is related to the content of the data request, simplifying generation 515 of the report. In one embodiment, the record 402 is reformatted so that the relationships between the stored data are more easily identifiable. The report is displayed 525 using the mobile computing device display 130, allowing the user to quickly identify data related to the content of the initial data request. An example report is further described below in conjunction with FIG. 8.

In an embodiment, data from the knowledge base module 350 is displayed 530 along with the report. This allows the relationship management module 300 to present the user with suggestions for how to react or respond to entities or events related to the data request. For example, data from the knowledge base module 350 recommending a public speaking class may be displayed 530 responsive to the generated report 515 indicating that a meeting is an event related to the data request. As another example, the report 402 data may include quantitative data indicating that a relationship between an entity in the data request and another entity is weak, so data from the knowledge base module 350 describing actions to strengthen the relationship is displayed 530.

Figure 6:
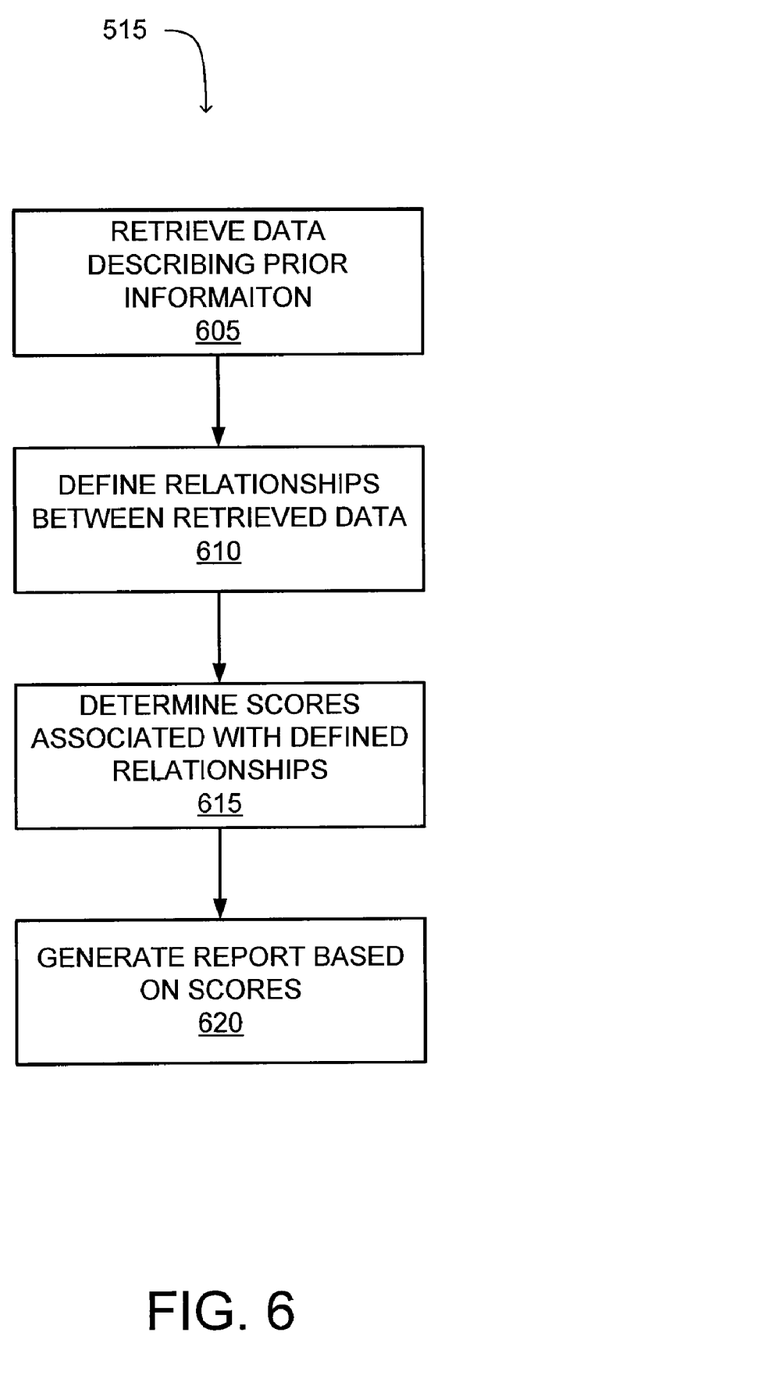
FIG. 6 illustrates one embodiment a method for generating a report based on data stored in a relationship management module.

FIG. 6 show a flow chart of one embodiment of a method 600 for generating a report based on data stored in a relationship management module. In an embodiment, the steps of the method 600 are implemented by the processor 220 executing instructions that cause the described actions. Those of skill in the art will recognize that one or more of the method steps may be implemented in embodiments of hardware and/or software or combinations thereof. For example, instructions for performing the described actions are embodied or stored within a computer readable medium, e.g., flash memory 214 or RAM 216, and are executable by a processor, such as central processor 220. Furthermore, those of skill in the art will recognize that other embodiments can perform the steps of FIG. 5 in different orders. Moreover, other embodiments can include different and/or additional steps than the ones described here.

Data is retrieved 605 from the event capture module 310, entity store 320 and task management module 330 responsive to the data request. For example, a record 402 whose entity name 410 field includes data matching an entity name or telephone number included in the data request is retrieved 605 from the relationship management module 300. The retrieved data is then evaluated to define 610 one or more relationships between the retrieved data and other data included in the relationship management module 300. As the event capture module, entity store 320 and task management module 330 include data describing relationships between data included in the event capture module, entity store 320 and/or task management module 330, additional data from the relationship management module 300 is retrieved. This allows the report to include additional data showing the user how data identified by the data request is related to other stored data. As the task management module 330 includes data describing relationships between a goal and one or more entities and between a goal and one or more events, examination of data from the task management module 330 associated with the data request defines 610 how data from the task management module 330 is related to data included in the event capture module 310 or entity store 320. Similarly, the entity store 320 includes data describing relationships between different entities between included in the entity store 320 or relationships between an entity and a goal or event included in the task management module 330 or event capture module 310, respectively. Hence, the relationship management module 300 allows retrieval of stored data related to the data request.

After defining 610 one or more relationships between the data request and stored data, the analysis module 340 determines 615 a score associated with each relationship. This score provides a quantifiable measure of how related are the different data elements. For example, a large numerical value associated with a relationship between two entities indicates that the two entities are closely related, such as by being close friends or family members. As another example, a large numerical value associated with a relationship between an entity and event indicates that the entity and event are closely related, indicating that the entity is participating in the event or affected by the outcome of the event.

The report is then generated 620 based on the determined scores. Hence, the scores allow for regulation of the data included in the report. For example, data having a score that equals or exceeds a threshold value is included in the report so that the report includes data having the strongest relationship to the data request. In one embodiment, a mathematical algorithm is applied to the scores to identify which data from the relationship management module 300 is included in the report.

Example Applications

Figure 7:
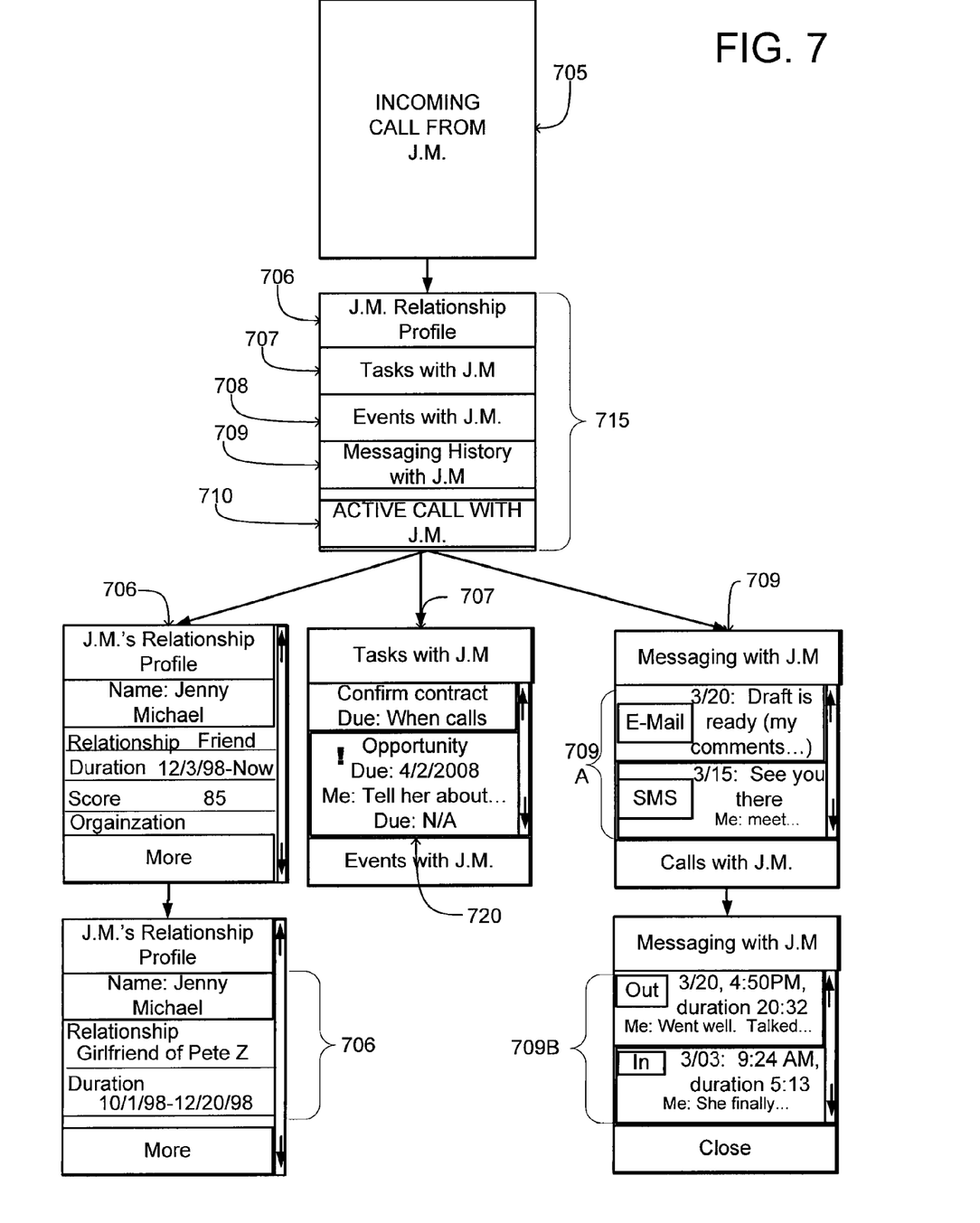
FIG. 7 illustrates one embodiment of data generated and displayed by a relationship management module.
Figure 8:
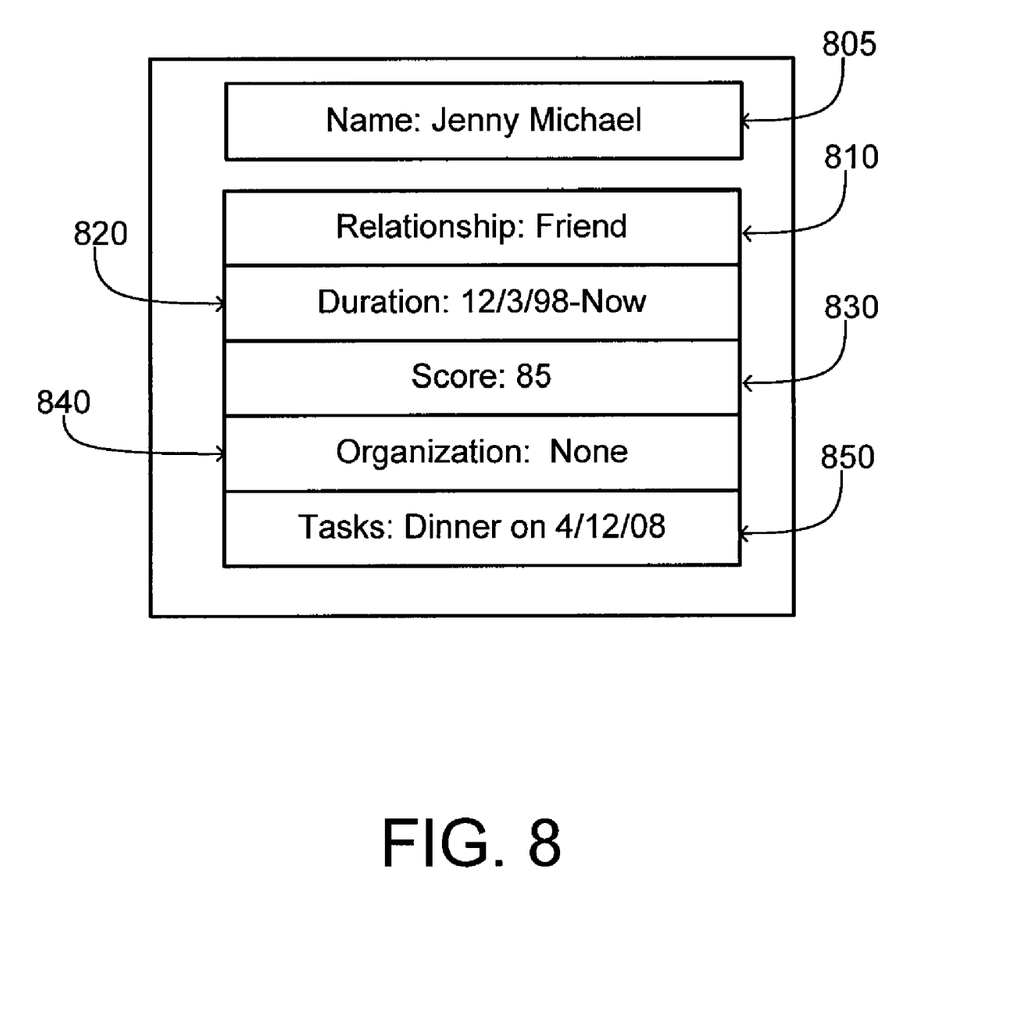
FIG. 8 illustrates one embodiment of a user interface for data entry into a relationship management module.

FIGS. 7 and 8 illustrate examples of displaying data from a relationship management module 300 to a mobile computing device user. FIG. 7 shows an embodiment of displaying data from the relationship management module 300 on a mobile computing device screen 130 using stackable toolbars 706, 707, 708, 709, 710. For purposes of illustration, FIG. 7 shows a relationship toolbar 706, a task toolbar 707, an event toolbar 708, a history toolbar 709 and a status toolbar 710. However, this is merely an example and in other embodiments more or fewer toolbars are displayed.

In an embodiment, when an event occurs or an interaction occurs with an entity already stored in the entity store 320 ("a stored entity"), one or more toolbars 706, 707, 708, 709, 710 associated with the stored entity are displayed on the screen 130 of the mobile computing device 110. Examples of interactions with an entity include receiving a telephone call, email or text message from a stored entity or placing a telephone call, email or text message to a stored entity. For purposes of illustration, FIG. 7 describes display of data from the relationship management module 300 responsive to receiving a telephone call from a stored entity.

When the mobile computing device 110 receives a telephone call, e.g. through the radio subsystem 250, from an entity that is identified as a stored entity, a notification message 705 is displayed on the screen 130. In an embodiment, an audible tone is played by the audio system 210 in addition to the notification message 705. To answer the call, the user provides a command to the mobile computing device 110 using, for example, a selection button 143*a*, 143*b*, a dedicated function button 147, the navigation area 150 or other input mechanism of the mobile computing device 110. Responsive to receiving the command to answer the call, the processor 220 retrieves data from the relationship management module 300 and communicates the retrieved data to the screen manager 226, window manager 222 and display adapter 230 for presentation to the user via the screen 130. This causes the screen 130 to present a relationship overview message 715 including the relationship toolbar 706, the task toolbar 707, the event toolbar 708, the history toolbar 709 and the status toolbar 710. These toolbars 706, 707, 708, 709, 710 allow the user to access different types of data included in the relationship management module 300 by accessing a toolbar 706, 707, 708, 709, 710. In an embodiment, the toolbars toolbar 706, 707, 708, 709, 710 are oriented so that they are adjacent to each other in a vertical direction and are expanded to substantially occupy the screen 130 responsive to a user input. This allows the relationship overview message 715 to indicate the different types data in the relationship management module 300 associated with the stored user while allowing the user to quickly retrieve a specific type of data by interacting with a toolbar 706, 707, 708, 709, 710.

Responsive to receiving a user input associated with the relationship toolbar 706, such as depressing a dedicated function button 147 associated with the relationship toolbar 706, depressing an area of the screen displaying the relationship toolbar 706 or input from the navigation area 150 highlighting and selecting the relationship toolbar 706, the relationship toolbar 706 is expanded by the window manager 222 or screen manager 226. When the relationship toolbar 706 is expanded, the screen 130 displays data from the entity store 320 describing relationships between the stored entity and other stored entities. For example, the relationship toolbar 706 displays the user-defined asymmetric relationship between the stored entity initiating the call and the mobile device user. As shown in FIG. 7, the relationship toolbar 706 indicates that the mobile device user has described the stored user initiating the call, "J. M," as a "Friend" of the user. In an embodiment, the relationship toolbar 706 also displays additional information, such as the duration of the relationship between the user and the stored entity or an organization associated with the stored entity.

Additionally, the relationship toolbar 706 may also display data from the analysis module 340 associating a score with the relationship between the user and the stored entity. The score describes the relative strength of the relationship and is modified by the analysis module 340 based on data from the user describing various interactions between the user and the stored entity. In an embodiment, the relationship toolbar 706 also indicates whether the score has increased or decreased from a prior interaction with the stored user. The relationship toolbar 706 also displays information describing a relationship between the stored entity initiating the call and one or more additional stored entities. In the example shown in FIG. 7, the relationship toolbar 706 describes a relationship between the stored entity initiating the call, "J. M," and another stored user "Pete Z." For purposes of illustration, FIG. 7 shows that the user has created a relationship indicating that "J. M" was a "Girlfriend" of the stored user "Pete Z" from "10/1/98-12/20/98." The relationship toolbar 706 also includes a scrollbar, in one embodiment, to allow the user to view different data included in the relationship toolbar 706 on the screen 130.

The task toolbar 707 is displayed on the screen 130 responsive to the mobile computing device 110 receiving a user input associated with the task toolbar 707, such as depressing a dedicated function button 147 associated with the task toolbar 707, depressing an area of a touch-sensitive screen displaying the task toolbar 707 or input from the navigation area 150 highlighting and selecting the task toolbar 707, the task toolbar 707 is expanded by the window manager 222 or screen manager 226. When expanded, the majority of the screen 130 displays task descriptions 720 from the task management module 330 associated with the stored entity initiating the call. As the task management module 330 includes data describing a relationship between a goal and one or more entities and/or one or more events, the displayed task descriptions 720 allow the mobile computing device user to view pending tasks associated with or involving the stored entity initiating the call. In the example of FIG. 7, the task toolbar 707 displays pending tasks associated with "J. M." In one embodiment, the task toolbar 707 displays a number of tasks having a due date near the time of the call from the stored entity. For example, the task tool bar 707 displays the number of tasks due within a specified time interval, such as one week, from the date of the interaction with the stored entity.

The task toolbar 707 also displays a due date, retrieved from the task management module 330, associated with the displayed tasks. Additionally, tasks having a specified due date based on interaction with the stored entity, such as a task due when the stored entity calls the user are visually distinguished from other displayed tasks, such as by blinking, being highlighted or appearing as a different color than other tasks, to remind the user of these tasks. For example, the task toolbar 707 displays data describing the entity that is to receive the completed goal, the entity requesting completion of the goal, one or more entities working on the s goal, an event by which the goal is to be completed or similar data. This allows the mobile device user to rapidly identify entities or events associated with a goal.

Additionally, the task toolbar 707 receives input from the user which is communicated to the task management module 330 for storage. For example, the task toolbar 707 receives user input describing notes associated with the task. In an embodiment, the task toolbar 707 also receives user input describing a score associated with the task. The score may indicate how successful the task was, the importance of the task to the stored entity or other data. The score is communicated to the analysis module 340 for storage and use in updating a cumulative score associated with the task.

In an embodiment, user input associated with the event toolbar 708 expands the event toolbar 708 so that the majority of the screen 130 displays data from the event capture module 310. For example, a calendar is displayed so that dates associated with events are visually distinguished from dates not associated with events. In an embodiment, a description, such as a title or summary, of the event is displayed in addition to the date associated with the event.

Responsive to receiving a user input associated with the history toolbar 709, such as depressing a dedicated function button 147 associated with the history toolbar 709, depressing an area of a touch-sensitive screen displaying the history toolbar 709 or input from the navigation area 150 highlighting and selecting the history toolbar 709, the history toolbar 709 is expanded by the window manager 222 or screen manager 226. When the history toolbar 709 is expanded, the screen 130 displays data from the communication capture module 370 describing communication between the mobile computing device user and the stored entity. For example, the history toolbar 709 displays data describing previous telephone calls to and from the stored entity, emails to and from the stored entity, text messages to and from the stored entity or other interactions with the stored entity involving the mobile computing device. As shown in FIG. 7, the history toolbar 709 is organized as two groups, a message group 709A and a call group 709B; however, in other embodiments, the history toolbar 709 is organized differently.

The message group 709A displays emails and/or text messages to and from the stored entity included in the communication capture module 370. In an embodiment, the message group 709A displays both emails and text messages at the same time with an icon or other identifier displayed to identify whether each displayed message is an email or a text message. The message group 709A also displays additional data from the communication capture module 370, such as user-entered notes or comments, to provide additional information to the user. Further, the message group 709A allows the user to enter data associated with a displayed message that is subsequently communicated to the communication capture module 370 for storage. Similarly, the user is able to enter a score describing the user's opinion of the message which is communicated to the analysis module 370. For example, the user enters notes or comments associated with the message which are stored in the communication capture module 370 and associated with the message. As illustrated in FIG. 7, the data associated with a displayed message is presented with a prefix of "Me:" to differentiate the data from the content of the message.

The call group 709B displays incoming and outgoing telephone calls and/or received voicemails involving the stored entity included in the communication capture module 370. The call group 709B also displays additional data from the communication capture module 370, such as user-entered notes or comments, to provide additional information about the telephone call or voicemail to the user. Further, the call group 709B allows the user to enter data associated with a call, such as a notation describing why the user missed a call or a topic discussed during the call, which is subsequently communicated to the communication capture module 370 for storage. Similarly, the user is able to enter a score describing the user's assessment of the call which is communicated to the analysis module 370. As illustrated in FIG. 7, the data associated with a displayed message is presented with a prefix of "Me:" to differentiate the data from the identification of the call.

The status toolbar 710 is displayed responsive to the user accepting or initiating an interaction with a stored entity. The status toolbar 710 displays the type of interaction, such as a telephone call, chat session, text message, occurring between the user and a stored entity. In an embodiment, the status toolbar 710 also displays the name of the stored entity involved in the interaction, providing the user with a summary of the parties involved in the current interaction and the type of interaction.

FIG. 8 shows one embodiment of a user interface for entering data into a relationship management module 300. In an embodiment, a mobile computing device user enters data into a plurality of fields displayed on the screen 130. Data entered into the fields is retrieved and stored by the relationship management module 300. For purposes of illustration, FIG. 8 depicts six fields, a name filed 805, a relationship description field 810, a relationship duration field 820, a score field 830, an organization field 840 and a task field 850 displayed on the screen 130; however, in other embodiments, the screen 130 displays more or fewer fields.

The name field 805 receives data describing an entity name, such as the name of a person, corporation or group. Data from the name field 805 is stored in the entity store 320 of the relationship management module 300. The relationship description field 810 receives data describing the relationship between the entity described in the name field 805 and the mobile device user. The mobile computing device 110 user enters a user-defined asymmetric relationship description field 810. This allows the mobile communication device user to provide an individual relationship identification that accounts for the user's subjective assessment or categorization of the relationship between the user and the entity identified in the name field 810. The relationship duration field 820 receives data from the user describing how long the user has interacted with the entity identified in the name field 810 or how long the user has categorized the relationship between the user and the entity identified in the name field 810 as the relationship provided in the relationship description field 820. In an embodiment, an organization field 830 allows the user to further identify the entity described in the entity name field 805 by providing an entity, such as a group or corporation, which is associated with the user identified in the name field 810. For example, the organization field 840 allows the user to identify a person's employer or an affiliation between a person and a group. Hence, data from the name field 805, relationship description field 810, relationship duration filed 820 and organization field 840 is stored in the entity store 320 for subsequent retrieval.

The score field 830 receives a numerical score from the user that quantifies the relationship between the user and the entity identified in the name field 805. For example, the score field 830 receives a numerical value from 1 to 100 describing how important the relationship with the entity identified in the name field 805 to the user or how important it is to the user to maintain the relationship as the type described in the relationship description field 810. Data from the score field 830 is communicated to the analysis module 340 where it is stored.

The task field 850 receives data describing one or more tasks that include or affect the user identified by the name field 805. This allows the user to establish a relationship between stored tasks and a stored entity. For example, the user maintains a relationship between a person and a scheduled dinner with the person or a relationship between a person who receives a completed report and a task to remind the user to complete the report. Hence, the task field 850 allows the user to store relationships between goals to be completed and persons or groups affected by the completed goal. The task field 850 communicates data to the task management module 330 and/or the event capture module 310 for storage so that the scheduled or desired completion date is stored.

Some portions of above description describe the embodiments in terms of algorithmic processes or operations, for example in FIGS. 4, 5, 6 and 7. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor 220 or equivalent electrical circuits, microcode, or the like. Furthermore, it has also proven convenient at times, to refer to these arrangements of functional operations as modules, for example as in FIGS. 2 and 3, without loss of generality. The described operations and their associated modules may be embodied in software, firmware, hardware, or any combinations thereof. Software embodiments may be configured as computer program products that comprise instructions stored in a computer readable storage medium, such as flash memory 214 or RAM memory 216, which are executable by a processor, such as processor 220.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for managing relationships between data, such as entities, tasks and events, using a mobile communication device. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A mobile computing device for maintaining relationships between data comprising:
    a computing device screen;
    an event capture module for storing an event identifier and a field describing a scheduled occurrence date associated with the event identifier;
    an entity store coupled to the event capture module for storing an entity identifier and one or more fields describing characteristics of an entity and for storing an entity-entity association between the entity identifier and a second entity, wherein the association is generated responsive to input from a user;
    a task management module coupled to the event capture module and the entity store for storing a task identifier describing an action associated with the user and for storing a task-entity association between the action associated with the user and the entity identifier or a task-action association between the action associated with the user and the entity identifier; and
    an analysis module coupled to the event capture module, the entity store and the task management module, the analysis module storing a user-defined entity score, a user-defined entity-entity association score, a user-defined event identifier score, a user defined task identifier score, a user-defined task-entity association score and a user-defined task-action association score and for displaying one or more of the entity, the entity-entity association, the event identifier, the task identifier, the task-entity and the task-action association using the computing device screen,
    wherein one of the scores comprises a numerical value based on a user assessment of one of the entity, the entity-entity association, the event identifier, the task identifier, the task-entity and the task-action association.

2. The mobile computing device of claim 1, wherein the analysis module displays the user-defined entity score, the user-defined entity-entity association score, the user-defined event identifier score, the user defined task identifier score, the user-defined task-entity association score and the user-defined task-action association score responsive to one or more of the user-defined entity-entity association score, the user-defined event identifier score, the user defined task identifier score, the user-defined task-entity association score and the user-defined task-action association score exceeding respective threshold values.

3. The mobile computing device of claim 1 further comprising
    a knowledge base module adapted to communicate with the analysis module for storing one or more case studies describing a response to a situation and for displaying a case study using the computing device screen responsive to analysis of the user-defined entity-entity association score, the user-defined event identifier score, the user defined task identifier score, the user-defined task-entity association score and the user-defined task-action association score.

4. The mobile computing device of claim 1, further comprising:
    a communication capture module adapted to communicate with the entity store, the communication capture module storing interactions between the mobile communication device and the entity identifier.

5. The mobile computing device of claim 4, wherein the interactions between the mobile computing device and the entity identifier comprise telephone calls from the mobile computing device to the entity associated with the entity identifier, telephone calls to the mobile computing device from the entity associated with the entity identifier, emails from the mobile computing device to the entity associated with the entity identifier, emails to the mobile computing device from the entity associated with the entity identifier, text messages from the mobile computing device to the entity associated with the entity identifier and text messages to the mobile computing device from the entity associated with the entity identifier.

6. A method for maintaining relationships between data for use with a mobile device, the method comprising:
    retrieving a record including a plurality of fields having one or more fields associated with a data request;
    determining a plurality of associations between the plurality of fields within the record, the plurality of associations describing relationships between the plurality of fields;
    determining an association score corresponding to each association and a field score corresponding to each field; and
    displaying a subset of the fields and associations between the subset of fields responsive to the corresponding association score and field score by:
        comparing each association score and field score to respective threshold values; and responsive to an association score and field score exceeding the respective threshold values, displaying the corresponding association and field.

7. The method of claim 6, further comprising:
retrieving data from a knowledge base describing an action or a situation response associated with a field within the subset of the fields; and
displaying the data from the knowledge base.

8. The method of claim 6, wherein the score comprises a numerical value describing a user assessment of the relationship between the plurality of fields.

9. The method of claim 6, wherein plurality of fields comprise an event, an entity and a task.

10. The method of claim 6, wherein the data request comprises an incoming telephone call, an outgoing telephone call, an incoming email, an outgoing email, an incoming chat message, an outgoing chat message or a user input.

11. The method of claim 6, wherein the association comprises a user-defined asymmetric relationship between a first field and a second field.

12. A computer readable storage medium with stored instructions, the instructions when executed by a processor cause the processor to:
retrieve a record including a plurality of fields having one or more fields associated with a data request;
determine a plurality of associations between the plurality of fields within the record, the plurality of associations describing relationships between the plurality of fields;
determine an association score corresponding to each association and a field score corresponding to each field; and
display a subset of the fields and associations between the subset of fields responsive to the corresponding association score and field score,
wherein one of the associations comprises a user-defined asymmetric relationship between a first field and a second field.

13. The computer readable medium of claim 12, further comprising instructions that cause the processor to:
retrieve data from a knowledge base describing an action or a situation response associated with a field within the subset of the fields; and
display the data from the knowledge base.

14. The computer readable medium of claim 12, wherein the score comprises a numerical value describing a user assessment of the relationship between the plurality of fields.

15. The computer readable medium of claim 12, wherein plurality of fields comprise an event, an entity and a task.

16. The computer readable medium of claim 12, wherein the data request comprises an incoming telephone call, an outgoing telephone call, an incoming email, an outgoing email, an incoming chat message, an outgoing chat message or a user input.

17. The computer readable medium of claim 12, wherein the instructions to display the subset of the fields and associations between the fields responsive to the score comprise instructions when executed by the processor cause the processor to:
compare each association score and field score to respective threshold values; and
responsive to an association score and field score exceeding the respective threshold values, display the corresponding association and field.

* * * * *